Patented May 3, 1949

2,469,157

UNITED STATES PATENT OFFICE 2,469,157

THERMOSETTING UREA-FORMALDEHYDE COMPOSITION

David E. Cordier, Toledo, Ohio, assignor to Libbey-Owens-Ford Glass Company, Toledo, Ohio, a corporation of Ohio No Drawing. Application February 4, 1948, Serial No. 6,343

5 Claims. (Cl. 260—17.3)

The invention relates to a thermosetting composition comprising a urea-formaldehyde reaction product and a novel potentially acid curing catalyst.

When a thermosetting composition is shaped in a mold under pressure at an elevated temperature, it first softens and then hardens at the molding temperature. In contrast, a thermoplastic composition that is hot-molded remains soft until the molded piece is cooled. Thus an article can be molded from a thermosetting composition by simply placing the composition in a hot mold, closing the mold under pressure, and then after a relatively short time removing the finished article while the mold is still hot. The molding of an article from a thermoplastic composition presents a more complex problem, because an article molded from such a composition must be cooled before the mold is opened to prevent blistering and other deformation which would occur if the mold were opened while the thermoplastic material was still hot.

The length of time for which a molding composition must be left in the mold is one of the factors determining the cost of articles molded from the composition. A composition that must be left in the mold twice as long as another composition requires about twice as much molding equipment for the same volume of production, and hot-molding equipment is expensive.

In the presence of an acid substance, a urea-formaldehyde reaction product is thermosetting; i. e., it is "cured" or transformed by heat from a fusible composition into an infusible resin. In order to cause such transformation to take place, an acid substance must be present to act as a catalyst. In the molding of an article from a urea-formaldehyde composition, it is necessary to leave the composition in the hot mold for a short time after the mold has been closed in order to complete the transformation to the infusible resin so as to produce an article of optimum quality. The length of time for which it is necessary to leave a urea-formaldehyde composition in the mold varies with the degree of acidity produced by the acid substance serving as a catalyst: the more acid the composition, the shorter the time required to complete the transformation to an infusible resin in the hot mold. There is, of course, a demand for urea-formaldehyde molding compositions which, in a relatively short time after the mold has been closed, are converted completely into an infusible resin so that the finished article can be removed from the mold.

In spite of the necessity for acidity during the molding of a urea-formaldehyde composition, a urea-formaldehyde composition cannot be supplied in an acid condition by a manufacturer, because a urea-formaldehyde composition if acid would be unstable in storage. If it were acid, a urea-formaldehyde composition gradually would become infusible at ordinary temperatures, and could not be sold by a manufacturer because it would be infusible and worthless by the time it reached the hands of a molder.

Even slight acidity which causes the composition to become infusible very gradually would make the composition commercially unacceptable, because the plasticity and other molding properties of the composition then would be wholly dependent upon the atmospheric temperature prevailing and the number of hours elapsing between the production of the composition by the manufacturer and the molding of the composition by the user. A user who molds articles from a urea-formaldehyde composition must select a composition of the proper plasticity and test the composition by molding it under various conditions to determine the exact conditions required to give the desired results. In order to maintain the quality of the product, he then must continue to use a composition of exactly the same plasticity and to mold it under exactly the same conditions. If the composition used by the molder is unstable and has molding properties that vary with the length of time elapsed since the composition was produced, it is impossible for the molder to mold successive articles from the composition with satisfactory results.

A "potentially acid" substance in a urea-formaldehyde composition is an ingredient that causes the transformation of the composition to an infusible resin in a hot mold, but does not materially impair the stability of the composition in storage at ordinary temperatures prior to hot molding. Such a substance is very rare. A potentially acid substance may be alkaline, neutral or so slightly acid at ordinary temperatures that it does not acidify appreciably a urea-formaldehyde composition when added thereto. It is believed that such a substance breaks up or undergoes molecular rearrangement to form an acid, but does not do so until the molding temperature is reached. In order to act as a curing catalyst, the acid so formed must be strong enough to cause the transformation of the urea-formaldehyde reaction product into an infusible resin.

A urea-formaldehyde molding composition contains an appreciable amount of moisture and frequently is kept in storage for weeks at a time before being used. Many substances that might be expected to decompose to form acids under the molding conditions suffer the same decomposition within a few hours after being intimately mixed with a urea-formaldehyde composition, and therefore are actually acid and not potentially acid in the composition. Moreover, the behavior of a substance when present as a minor ingredient in a molding composition and subjected to molding pressure at the molding temperature of 270° to 330° F. cannot be predicted from its behavior when subjected by itself to such a temperature under atmospheric pressure. Usually a substance that does not impair the stability of a molding composition fails to cause transformation of the composition to an infusible resin in a hot mold.

Although certain halogenated organic compounds that liberate hydrobromic or hydrochloric acid when heated have been known to act as potentially acid substances when incorporated in urea-formaldehyde molding compositions, substances that liberate organic acids are preferable to substances that liberate strong inorganic acids, because of the danger of mold corrosion by strong inorganic acids. Certain organic peroxides, such as benzoyl peroxide, have been used heretofore as potentially acid substances, but there are many organic pigments useful in molding compositions that are deleteriously affected when a peroxide is present.

The principal object of the invention is to provide a thermosetting urea-formaldehyde composition containing a novel type of potentially acid substance. More specific objects and advantages are apparent from the description, which merely discloses and illustrates the invention, and is not intended to impose limitations upon the claims.

The thermal decomposition of a sulfonate ester appears to be a class reaction which involves rupture of the molecule at the ester linkage. The ester linkage may be represented structurally as

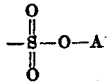

wherein A is an organic (alcohol) radical. It has been found that the ester linkage is very stable if A is an aryl radical, for example, the phenyl radical in phenyl p-toluenesulfonate:

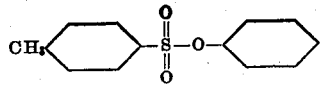

which does not undergo thermal decomposition at molding temperatures. In contrast, the ester linkage is not stable at molding temperatures if A is an aliphatic radical, for example, the ethyl radical in ethyl p-toluenesulfonate:

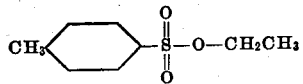

which undergoes thermal decomposition at molding temperatures, or the benzyl radical in benzyl p-toluenesulfonate:

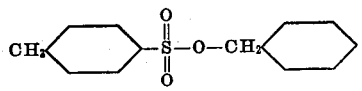

which is so unstable that it decomposes at room temperature within a few hours and, consequently, is useless as a molding catalyst. As a rule then, to render a sulfonate ester thermally unstable, A must be an aliphatic radical, and of all such compounds in which A is an aliphatic radical those compounds in which A is a benzyl radical are the least stable; and therefore, the benzyl radical is the aliphatic radical which is the least analogous in function to an aryl radical in the "A" position.

The foregoing rule that the radical A must be an aliphatic radical to render a sulfonate ester thermally unstable is understood to apply only to an ester of an aryl sulfonic acid, i. e., a sulfonate ester which may be represented structurally as

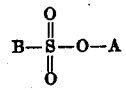

wherein A is the radical hereinbefore described and B is an aryl radical. Certain advantages in the physical properties of the sulfonate ester might be obtained by the use of an aliphatic sulfonic acid instead of an aryl sulfonic acid in the preparation of the ester. However, a sulfonate ester in which B is an aliphatic radical such as the ethyl radical, for example, in ethyl ethanesulfonate (B. P. 213° C.):

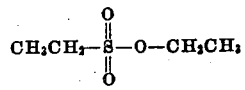

does not undergo thermal decomposition at molding temperatures. In view of the foregoing observations, it would be expected that a sulfonate ester containing the benzyl radical could not be used as a molding catalyst, since it would be expected either (1) that the benzyl radical in either the "A" or "B" position would not form a linkage with the —SO₃— group which is stable at room temperature or (2) that the benzyl group in either the "A" or "B" position in a sulfonate ester molecule would function substantially the same as any other aliphatic radical. In either case, an ester or benzyl sulfonic acid would be expected to be useless as a potentially acid curing catalyst.

The instant invention is based on the discovery that certain esters of benzyl sulfonic acid are particularly useful as poentially acid substances. Although the benzyl radical in the "A" position forms an extremely unstable linkage with the —SO₃— group, the benzyl radical in the "B" position forms a very stable linkage with the —SO₃— group; and, although the (aliphatic) benzyl radical functions like any other aliphatic radical in the "A" position, the benzyl radical functions like an aryl radical and unlike an aliphatic radical in the "B" position.

A dry thermosetting composition embodying the invention comprises a urea-formaldehyde reaction product and a potentially acid substance consisting of a mono-ester of benzyl sulfonic acid with an alcohol selected from the class consisting of (1) borneol, (2) menthol, (3) unsubstituted saturated aliphatic monohydric and dihydric alcohols having from two to eight carbon atoms, (4) mono-ethers of (a) unsubstituted saturated aliphatic monohydric alcohols having from one to five carbon atoms and unsubstituted monohydric phenols having from six to sixteen carbon atoms and having not more than two side chains each of which is saturated and contains not more than five carbon atoms with (b) unsubstituted saturated aliphatic dihydric alcohols having from two to five carbon atoms, (5) polyethylene glycols having from two to four ethylene groups, and (6) mono-substituted hydrocarbons of the benzene series having from eight to twenty-one carbon atoms and having from one to three side chains each of which is saturated and contains not more than five carbon atoms, the substituted carbon atom being attached only to one hydroxy group, from one to two hydrogen atoms and from one to two exocyclic carbon atoms.

In other words, the potentially acid substance in a composition embodying the invention consists of a mono-ester of benzyl sulfonic acid with an alcohol selected from the class consisting of borneol, menthol, unsubstituted saturated aliphatic monohydric and dihydric alcohols having from two to eight carbon atoms, mono-alkyl ethers, mono-phenyl ethers, mono-(alkyl phenyl) ethers and mono-(alkyl alkyl phenyl) ethers of saturated aliphatic dihydric alcohols in the series from ethylene glycol to amylene glycols, polyethylene glycols from diethylene glycol to tetraethylene glycol, and primary and secondary saturated aliphatic monohydric alcohols from ethyl to amyl in which a carbon atom, other than the hydroxy-substituted carbon atom, has a substituent selected from the class consisting of phenyl, alkyl phenyl and alkyl alkyl phenyl, the groups designated by the term "alkyl" ranging from methyl to amyl. Such a composition always contains a slight amount of moisture, and the term "dry" is used herein to signify dry to the touch.

Examples of the potentially acid substance used in the practice of the invention are:

(1) The ester of benzyl sulfonic acid with borneol or menthol, or ethyl, propyl, isopropyl, butyl, isobutyl or secondary butyl alcohol, or any primary or secondary amyl, hexyl, heptyl or octyl alcohol;

(2) The mono-ester of benzyl sulfonic acid with ethylene glycol, or a propylene glycol, or a glycol in the series from butylene glycols to octylene glycols (e. g., octamethylene glycol);

(3) The ester of benzyl sulfonic acid with a monoether of (a) ethylene glycol, or a propylene, butylene or amylene glycol (e. g., pentamethylene glycol) with (b) methyl alcohol (e. g., beta-methoxy ethanol) or ethyl, propyl, isopropyl, butyl, isobutyl, secondary butyl, or any amyl alcohol, or phenol or a phenol having as a side chain one methyl or ethyl or any propyl, butyl or amyl radical (e. g., from o-, m- or p-cresol to an o-, m- or p-pentyl phenol), or a phenol having two side chains each of which is methyl (e. g., 1,2,3-xylenol) or ethyl or any propyl, butyl or amyl radical;

(4) The mono-ester of benzyl sulfonic acid with diethylene glycol, triethylene glycol or tetraethylene glycol; and (5) The ester of benzyl sulfonic acid with a substituted ethyl alcohol (or a substituted primary or secondary propyl, butyl or amyl alcohol) in which the substituent is attached to a carbon atom other than the hydroxy-substituted carbon atom (e. g., the beta carbon atom), and the substituent is phenyl (e. g., beta-phenyl ethanol), or a phenyl radical substituted with a methyl radical (e. g., o-, m- or p-tolyl) or an ethyl radical or any propyl, butyl or amyl radical, or a phenyl radical having two substituents each of which is a methyl radical (e. g., 2,3-xylyl) or an ethyl radical or any propyl, butyl or amyl radical.

The preferred esters of benzyl sulfonic acid are its mono-esters with ethyl and amyl alcohols and with glycol. Another potentially acid substance that may be employed is the mono-ester of benzyl sulfonic acid with another simple monohydric or dihydric alcohol or glycol from a mono or dihydroxy propane to a mono or dihydroxy octane; or with the mono ether of a simple glycol from ethylene glycol to a dihydroxy pentane and a simple alcohol from methanol to a pentanol, or phenol or an alkyl phenol, from o-, m- or p-cresol to an o-, m- or p-pentyl phenol, or an alkyl alkyl phenol, in which the alkyl radicals range from methyl to pentyl, such as a xylenol; or with a polyethylene glycol from diethylene glycol to tetraethylene glycol; or with a substituted simple primary or secondary alcohol from ethanol to a pentanol in which the substituent is attached to a carbon atom other than the hydroxy-substituted carbon atom and is phenyl or an alkyl phenyl radical from o-, m- or p-tolyl to o-, m- or p-pentyl phenyl, or an alkyl alkyl phenyl radical, in which the alkyl radicals range from methyl to pentyl, such as a xylenyl radical. In each class of aliphatic radicals referred to above, any of the various structural isomers may be used. The alkyl phenyl or alkyl alkyl phenyl groups in the alcohols referred to above, for example in a beta-substituted ethanol, may be any of the various position isomers, such as a o-, m- or p-tolyl group or any xylenyl group.

In the preparation of a reaction product of urea and formaldehyde for use in a composition embodying the invention, the urea may be reacted either with formaldehyde or with a polymer thereof, such as paraformaldehyde. Although under some conditions it is permissible to react dry urea with dry paraformaldehyde, the reaction preferably is carried out in an aqueous solution that is approximately neutral at the start of the reaction. Since a commercial aqueous formaldehyde solution is strongly acid, a base preferably is added to bring the initial pH of the reaction solution to the desired value. Any desired base, such as sodium or potassium hydroxide or any weaker base, or an organic base such as triethanolamine may be employed. The preferred proportion of formaldehyde is three mols for every two mols of urea. Approximately two mols of formaldehyde are all that will react with each mol of urea, but an excess of formaldehyde above such maximum or a smaller proportion ranging down to about one mol of formaldehyde for each mol of urea may be used for the reaction if desired. Because of the complexity of the molecules of the reaction products that are produced, the proportion of formaldehyde actually reacting with the urea may vary freely between the limits stated. The reaction proceeds at ordinary temperatures, but heat may be used to shorten the time of reaction if desired. A reaction product may be prepared by carrying the reaction of the urea and formaldehyde only to its earliest stage, for example the stage at which the urea and formaldehyde have just been brought into solution together, or the reaction may be carried to any further stage at which the reaction product is still fusible.

The preferred method of preparing a molding composition consists in preparing an aqueous solution of a urea-formaldehyde reaction product, impregnating a cellulosic filler with the solution, and then drying. Although alpha cellulose is the purest and lightest-colored cellulosic filler, any other cellulosic material, such as wood flour, wood pulp, newsprint, printed newspaper, sawdust, shavings, walnut shell flour, or ground corn cobs may be used. The impregnated and dried celulosic material preferably is ground to a fine powder in order to produce a homogeneous composition, and the potentially acid substance preferably is incorporated during the grinding stage. The customary modifiers such as hot-plate lubricants, opacifiers, pigments and other coloring matter also may be incorporated during the grinding. The fine powder so obtained may be formed into coarse granules, or into solid blanks or preforms of the proper sizes for use in various molds. Molded articles may be produced in the usual manner by compressing the composition in a closed mold under a pressure of one to four tons per square inch of projected area and at a temperature of 270–330° F. If cellulosic material is present in a dry composition embodying the invention, the proportion thereof preferably is from about 30 to about 40 per cent by weight, but may range to as much as 60 per cent in the case of a dense cellulosic material such as walnut shell flour. The proportion of the potentially acid substance employed is simply that proportion which causes the hardening to take place at the desired speed. Since the potentially acid substance is a curing catalyst the usual "catalytic" amount may be used (i. e., ranging from about 0.1 to about 5 per cent of the weight of the molding composition), but the usual proportion is about one-half of one per cent of the weight of the molding composition.

*Example*

After alpha cellulose fiber (80 parts by weight) has been impregnated with an aqueous solution containing 120 parts of a urea-formaldehyde reaction product, the impregnated material is dried by any of the usual drying methods. Heat may be used as is customary to expedite the drying, and drying by means of a stream of air is convenient. The dried material is ground in a ball mill together with 0.5 per cent of its weight of a potentially acid substance hereinbefore described (e. g., n-amyl or ethyl benzylsulfonate), and any other desired modifiers. The resulting powder is usable as a molding composition for many applications but can be granulated or preformed.

If the foregoing procedure is carried out using a potentially acid substance which has a melting point above room temperature (e. g., ethylene glycol mono-benzylsulfonate), the substance can be ground into the material and thoroughly dispersed more quickly and easily than a liquid potentially acid substance.

The esters of benzyl sulfonic acid referred to above may be prepared by the conventional method of preparing sulfonates which is as follows: The sulfonyl chloride corresponding to the acid is mixed with a slight excess of the alcohol and an amount of pyridine equal to two or three equivalents is added in small proportions with stirring while the reaction vessel is cooled to maintain the temperature below 25° C. The pyridine reacts with the hydrogen chloride liberated by the esterification reaction, to form pyridine hydrochloride. The reaction solution is allowed to stand overnight and is then mixed with distilled water. The water dissolves the pyridine hydrochloride and forms a layer that can be separated from the ester layer. The ester layer is purified by washing with water, and dried. Crystallization to produce a solid suitable for addition to a ball mill can be induced by chilling or freezing the ester.

Although it is not desired to limit the invention to any particular theory, it is believed that the thermal decomposition of a benzyl sulfonate ester in the practice of the invention involves rupture of the molecule at the ester linkage, as follows:

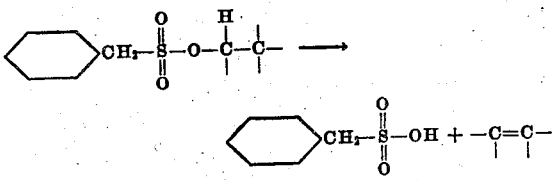

The hydrogen atom that becomes the acid hydrogen atom in the liberate benzyl sulfonic acid is pulled over or transferred from the carbon atom that is adjacent the oxygen atom forming the ester linkage, and a double bond is formed between the carbon atom from which the hydrogen atom is transferred and an adjacent carbon atom. Hence, decomposition to form benzyl sulfonic acid does not take place if a hydrogen atom is not available on the carbon atom adjacent the oxygen linkage, for example, in a sulfonate ester in which the radical A is a phenyl radical, which may be represented as

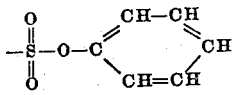

or if a hydrogen atom is not readily detachable from the carbon atom adjacent the oxygen linkage, for example, in a sulfonate ester in which the radical A is a methyl radical, which may be represented as

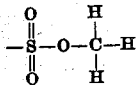

Therefore, the ability of a benzyl sulfonate ester to undergo the desired thermal decomposition depends upon the presence of a detachable hydrogen atom attached to the carbon atom adjacent the oxygen linkage. On the other hand, certain other sulfonate esters having in the molecule a very easily detachable hydrogen atom attached to the carbon atom adjacent the oxygen linkage undergo thermal decomposition so readily that they are unstable at room temperature. For example, in a sulfonate ester in which the radical A is a benzyl radical, which may be represented as

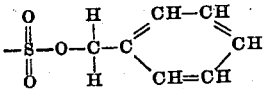

a hydrogen atom attached to the carbon atom adjacent to the oxygen atom is so readily detachable (perhaps because of the extremely low electronegativity of the benzyl radical) that such an ester cannot be used as a potentially acid substance because it is unstable at room temperature and liberates a sulfonic acid that converts a urea-formaldehyde reaction product to the infusible state during storage.

No satisfactory reason has been found to explain why the esters of benzyl sulfonic acid are not similar in thermal stability to the esters of other aliphatic sulfonic acids, but instead are quite similar in this property to the esters of aryl sulfonic acids. However, it has now been discovered that the thermal stability of a benzyl sulfonate ester is dependent upon the strength of the bond by which a hydrogen atom is attached to the carbon atom adjacent the oxygen atom in the ester linkage, and the esters in which the foregoing bond is of the required strength are those esters herein described as usable in the practice of the present invention and set forth in the following claims.

This is a continuation-in-part of application Serial No. 529,189, filed April 1, 1944, and now abandoned.

Various compositions embodying the invention may be prepared to meet various requirements.

Having described my invention, I claim:

1. A dry thermosetting composition comprising a urea-formaldehyde reaction product and a potentially acid substance consisting of a mono-ester of benzyl sulfonic acid with an alcohol selected from the class consisting of (1) borneol, (2) menthol, (3) unsubstituted saturated aliphatic monohydric and dihydric alcohols having from two to eight carbon atoms, (4) mono-ethers of (a) unsubstituted saturated aliphatic monohydric alcohols having from one to five carbon atoms and unsubstituted monohydric phenols having from six to sixteen carbon atoms and having not more than two side chains each of which is saturated and contains not more than five carbon atoms with (b) unsubstituted aliphatic dihydric alcohols having from two to five carbon atoms, (5) polyethylene glycols having from two to four ethylene groups, and (6) mono-substituted hydrocarbons of the benzene series having from eight to twenty-one carbon atoms and having from one to three side chains each of which is saturated and contains not more than five carbon atoms, the substituted carbon atom being attached only to one hydroxy group, from one to two hydrogen atoms and from one to two exocyclic carbon atoms.

2. A dry thermosetting composition comprising a urea-formaldehyde reaction product, cellulose, and a potentially acid substance consisting of a mono-ester of benzyl sulfonic acid with an alcohol selected from the class consisting of (1) borneol, (2) menthol, (3) unsubstituted saturated aliphatic monohydric and dihydric alcohols having from two to eight carbon atoms, (4) mono-ethers of (a) unsubstituted saturated aliphatic monohydric alcohols having from one to five carbon atoms and unsubstituted monohydric phenols having from six to sixteen carbon atoms and having not more than two side chains each of which is saturated and contains not more than five carbon atoms with (b) unsubstituted saturated aliphatic dihydric alcohols having from two to five carbon atoms, (5) polyethylene glycols having from two to four ethylene groups, and (6) mono-substituted hydrocarbons of the benzene series having from eight to twenty-one carbon atoms and having not more than three side chains each of which is saturated and contains not more than five carbon atoms, the substituted carbon atom being attached only to one hydroxy group, from one to two hydrogen atoms and from one to two exocyclic carbon atoms.

3. A dry thermosetting composition comprising a urea-formaldehyde reaction product and ethyl benzylsulfonate as a potentially acid substance.

4. A dry thermosetting composition comprising a urea-formaldehyde reaction product and amyl benzylsulfonate as a potentially acid substance.

5. A dry thermosetting composition comprising a urea-formaldehyde reaction product and glycol mono-benzylsulfonate as a potentially acid substance.

DAVID E. CORDIER.

No references cited.